US008641839B2

(12) United States Patent
Schroers et al.

(10) Patent No.: US 8,641,839 B2
(45) Date of Patent: Feb. 4, 2014

(54) METHOD FOR IMPRINTING AND ERASING AMORPHOUS METAL ALLOYS

(75) Inventors: Jan Schroers, Hamden, CT (US); Golden Kumar, New Haven, CT (US); Hongxing Tang, Orange, CT (US)

(73) Assignee: Yale University, New Haven, CT (US)

( * ) Notice: Subject to any disclaimer, the term of this patent is extended or adjusted under 35 U.S.C. 154(b) by 656 days.

(21) Appl. No.: 12/526,792

(22) PCT Filed: Feb. 13, 2008

(86) PCT No.: PCT/US2008/001990
§ 371 (c)(1),
(2), (4) Date: Nov. 19, 2009

(87) PCT Pub. No.: WO2008/100583
PCT Pub. Date: Aug. 21, 2008

(65) Prior Publication Data
US 2010/0098967 A1    Apr. 22, 2010

Related U.S. Application Data

(60) Provisional application No. 60/901,461, filed on Feb. 13, 2007, provisional application No. 61/022,065, filed on Jan. 18, 2008.

(51) Int. Cl.
*B22D 21/00* (2006.01)
*B22D 19/16* (2006.01)
*C22C 45/00* (2006.01)

(52) U.S. Cl.
USPC ............. 148/561; 148/522; 164/72; 164/92.1

(58) Field of Classification Search
None
See application file for complete search history.

(56) References Cited

U.S. PATENT DOCUMENTS

| | | | |
|---|---|---|---|
| 5,772,905 A | 6/1998 | Chou | |
| 5,950,704 A * | 9/1999 | Johnson et al. | 164/47 |
| 6,165,911 A | 12/2000 | Calveley | |
| 6,900,881 B2 | 5/2005 | Sreenivasan et al. | |
| 7,137,803 B2 | 11/2006 | Chou | |
| 7,293,599 B2 | 11/2007 | Peker et al. | |
| 7,906,219 B2 * | 3/2011 | Ohara et al. | 428/615 |
| 2004/0046288 A1 | 3/2004 | Chou | |
| 2004/0211222 A1* | 10/2004 | Hosoe | 65/374.12 |
| 2005/0123686 A1 | 6/2005 | Myrick | |

(Continued)

OTHER PUBLICATIONS

Amorphous Metal Alloys Form Like Plastics, Schroers et al., Advanced Materials & Processes, Jan. 2006, pp. 61-63.

(Continued)

*Primary Examiner* — George Wyszomierski
(74) *Attorney, Agent, or Firm* — Carmody & Torrance LLP

(57) ABSTRACT

The present invention relates to materials, methods and apparatuses for performing imprint lithography using amorphous metallic materials. The amorphous metallic materials can be employed as imprint media and thermoplastic forming processes are applied during the pattern transfer procedure to produce micron scale and nanoscale patterns in the amorphous metallic layer. The pattern transfer is in the form of direct mask embossing or through a serial nano-indentation process. A rewriting process is also disclosed, which involves an erasing mechanism that is accomplished by means of a second thermoplastic forming process. The amorphous metallic materials may also be used directly as an embossing mold in imprint lithography to allow high volume imprint nano-manufacturing. This invention also comprises of a method of smoothening surfaces under the action of the surface tension alone.

23 Claims, 15 Drawing Sheets

(56) References Cited

U.S. PATENT DOCUMENTS

| | | | |
|---|---|---|---|
| 2005/0242454 A1* | 11/2005 | Yuasa et al. | 264/2.5 |
| 2005/0277286 A1 | 12/2005 | Suh | |
| 2006/0124209 A1 | 6/2006 | Schroers et al. | |
| 2006/0157164 A1 | 7/2006 | Johnson et al. | |

OTHER PUBLICATIONS

Thermoplastic Forming of Bulk Metallic Glass—A Technology for MEMS and Microstructure Fabrication, Schroers et al., Journal of Microelectromechanical Systems, vol. 16, No. 2, Apr. 2007, pp. 240-247.

On the formability of bulk metallic glass in its supercooled liquid state, J. Schroers, Acta Materialia, vol. 56, 2008, pp. 471-478.

Bulk Amorphous Metal—An Emerging Engineering Material, W. Johnson, JOM, Mar. 2002, pp. 40-43.

Metallic glasses as structural materials, Ashby et al., Scripta Materialia, vol. 54, 2006, pp. 321-326.

Mechanical behavior of amorphous alloys, Schuh et al., Acta Materialia, vol. 55, 2007, pp. 4067-4109.

Preparation of high aspect ratio surface microstructures out of a Zr-based bulk metallic glass, Kundig et al., Microelectronic Engineering, vol. 67-68, 2003, pp. 405-409.

Superplastic Nanoforming of Pd-Based Amorphous Alloy, Saotome et al., Scripta mater, vol. 44, 2001, pp. 1541-1545.

The micro-formability of Zr-based amorphous alloys in the supercooled liquid state and their application to micro-dies, Saotome et al., Journal of Materials Processing Technology, vol. 113, 2001, pp. 64-69.

Micromolding three-dimensional amorphous metal structures, Bardt et al., J. Mater. Res., vol. 22, No. 2, Feb. 2007, pp. 339-343.

Nanoimprint of gratings on a bulk metallic glass, Chu et al., Applied Physics Letters, vol. 90, 2007, pp. 034101-1-034101-3.

Nano-fabrication with metallic glass—an exotic material for nano-electromechanical systems, Sharma et al., Institute of Physics Publishing, Nanotechnology, vol. 18, 2007, pp. 1-6.

Full Strength compacts by extrusion of glassy metal powder at the supercooled liquid state, Kawamura et al., Appl. Phys. Lett., vol. 67 (14), Oct. 1995, pp. 2008-2010.

Synthesis of $Cu_{47}Ti_{34}Zr_{11}Ni_8$ bulk metallic glass by warm extrusion of gas atomized powders, Sordelet et al., J. Mater. Res., vol. 17, No. 1, Jan. 2002, pp. 186-198.

The Effect of Temperature and Extrusion Speed on The Consolidation of Zirconium-Based Metallic Glass Powder Using Equal-Channel Angular Extrusion, Karaman et al., Metallurgical and Materials Transactions A, vol. 35A, Jan. 2004, pp. 247-256.

Synthesis method for amorphous metallic foam, Schroers et al., Journal of Applied Physics, vol. 96, No. 12, Dec. 15, 2004, pp. 7723-7730.

Blow Molding of bulk metallic glass, Schroers et al., Scripta Materialia, vol. 57, 2007, pp. 341-344.

A novel metallic glass composite synthesis method, Schroers et al., Scripta Materialia, vol. 56, 2007, pp. 177-180.

On the formability of bulk metallic glass in its supercooled liquid state, Schroers et al., Acta Materialia, vol. 56, 2008, pp. 471-478.

A Microscopic Mechanism for Steady State Inhomogeneous Flow In Metallic Glasses, F. Spaepen, Acta Materialia, vol. 25, 1976, pp. 407-415.

Deformation behavior of the $Zr_{41.2}Ti_{13.8}Cu_{12.5}Ni_{10}Be_{22.5}$ bulk metallic glass over a wide range of strain-rates and temperatures, Lu et al., Acta Materialia, vol. 51, 2003, pp. 3429-3443.

Thermophysical properties of a $Cu_{46}Zr_{42}Al_7Y_5$ bulk metallic glass-forming liquid, Fan et al., Applied Physics Letters, vol. 88, 2006, pp. 221909-1-3.

Thermodynamics, kinetics, and crystallization of $Pt_{57.3}Cu_{14.6}Ni_{5.3}P_{22.8}$ bulk metallic glass, Legg et al., Acta Materialia, vol. 55, 2007, pp. 1109-1116.

Transition From Nucleation Controlled to Growth Controlled Crystallization in $Pd_{43}Ni_{10}Cu_{27}P_{20}$ Melts, Schroers et al., Acta Materialia, vol. 49, 2001, pp. 2773-2781.

Drawing Nanoscale Features The Fast and Easy Way, Science Daily, Sep. 11, 2007, pp. 1-3.

Write and erase mechanisms for bulk metallic glass, Kumar et al., Applied Physics Letters 92, 031901 (2008).

Fluid Motion Using liquidmetal alloys for jewelry applications, Schroers, MJSA Journal, Jul. 2006, pp. 47-52.

The Superplastic Forming of Bulk Metallic Glasses, Schroers, JOM, May 2005, pp. 35-39.

Precious bulk metallic glasses for jewelry applications, Schroers et al., Materials Science & Engineering A 449-451 (2007), pp. 235-238.

Thermoplastic forming of bulk metallic glass —Applications for MEMS and microstructure fabrication, Schroers et al., Materials Science & Engineering A 449-451 (2007), pp. 898-902.

* cited by examiner

METHOD FOR IMPRINTING AND ERASING AMORPHOUS METAL ALLOYS

CROSS REFERENCE TO RELATED APPLICATIONS

This application is a National Stage application of International Application No. PCT/US2008/001990, filed Feb. 13, 2008, which claims the benefit of U.S. Provisional Application No. 60/901,461, filed Feb. 13, 2007, and U.S. Provisional Application No. 61/022,065, filed Jan. 18, 2008, the subject matter of each of which is herein incorporated by reference in its entirety.

FIELD OF THE INVENTION

The present invention relates to improved techniques for nano-imprinting a pattern into an amorphous metal alloy substrate as well as erasing a pattern from the substrate.

BACKGROUND OF THE INVENTION

Bulk metallic glasses (BMGs), which are also known as bulk solidifying amorphous alloy compositions, are a class of amorphous metallic alloy materials that are regarded as prospective materials for a vast range of applications because of their superior properties such as high yield strength, large elastic strain limit, and high corrosion resistance.

A unique property of BMG is that they have a super-cooled liquid region (SCLR), $\Delta Tsc$, which is a relative measure of the stability of the viscous liquid regime. The SCLR is defined by the temperature difference between the onset of crystallization, Tx, and the glass transition temperature, Tg of the particular BMG alloy. These values can be conveniently determined by using standard calorimetric techniques such as DSC (Differential Scanning Calorimetry) measurements at 20° C./min.

Generally, a larger $\Delta Tsc$ is associated with a lower critical cooling rate, though a significant amount of scatter exists at $\Delta Tsc$ values of more than 40° C. Bulk-solidifying amorphous alloys with a $\Delta Tsc$ of more than 40° C., and preferably more than 60° C., and still more preferably a $\Delta Tsc$ of 70° C. and more are very desirable because of the relative ease of forming. In the supercooled liquid region the bulk solidifying alloy behaves like a high viscous fluid. The viscosity for bulk solidifying alloys with a wide supercooled liquid region decreases from $10^{12}$ Pa·s at the glass transition temperature to $10^7$ Pa·s and in some cases to $10^5$ Pa·s. Heating the bulk solidifying alloy beyond the crystallization temperature leads to crystallization and immediate loss of the superior properties of the alloy and it can no longer be formed.

Superplastic forming (SPF) of an amorphous metal alloy involves heating it into the SCLR and forming it under an applied pressure. The method is similar to the processing of thermoplastics, where the formability, which is inversely proportional to the viscosity, increases with increasing temperature. In contrast to thermoplastics however, the highly viscous amorphous metal alloy is metastable and eventually crystallizes.

Crystallization of the amorphous metal alloy must be avoided for several reasons. First, it degrades the mechanical properties of the amorphous metal alloy. From a processing standpoint, crystallization limits the processing time for hot-forming operation because the flow in crystalline materials is order of magnitude higher than in the liquid amorphous metal alloy. Crystallization kinetics for various amorphous metal alloys allow processing times between minutes and hours in the described viscosity range. This makes the superplastic forming method a finely tunable process that can be performed at convenient time scales, enabling the net-shaping of complicated geometries. Since similar processing pressures and temperatures are used in the processing of thermoplastics, techniques used for thermoplastics, including compression molding, extrusion, blow molding, and injection molding have also been suggested for processing amorphous metal alloys.

Amorphous metal alloys are an ideal material for small geometries because they are homogeneous and isotropic. This is due to the fact that no "intrinsic" limitation such as the grain size in crystalline materials is present. Also, since thermoplastic forming is done isothermally and the subsequent cooling step can be carried out slowly, thermal stresses can be reduced to a negligible level.

Particularly interesting for small scale applications like MEMS (micro-electro-mechanical-systems), microstructures, NEMS (nano-electro-mechanical-systems), and nanoimprinting, these materials exhibit an isotropic and homogeneous structure even below the length scales of interest. However, these applications are still limited by the difficulties associated with net-shape fabrication.

Two fundamentally different processing routes can be used. The first processing method, direct casting of three-dimensional components, requires simultaneous filling and fast cooling of complex dies, which makes high aspect ratio geometries challenging. Furthermore, direct casting relies on wetting of the mold material by the amorphous metal alloy, which limits for example the use of silicon as a mold material and is not compatible with most of MEMS fabrication methods. An alternate method is thermoplastic forming (TPF), which has been explored for a wide range of processes including net-shape processing, micro and nano replication, extrusion, synthesis of amorphous metallic foams, blow molding, and synthesis of amorphous metal alloy composites. Thermoplastic forming of the amorphous metal alloy is enabled by the existence of a supercooled liquid region (SCLR), as discussed above.

To form amorphous metal alloys using a superplastic forming process, the amorphous metal alloy must be in its amorphous state, which means that the feedstock must be processed so that the sample is cooled fast to avoid crystallization. During this step, the amorphous metal alloy is typically not formed into its final shape but is rather cast into simple geometries such as cylinders, pellets, and powders. Thereafter, the amorphous metal alloy is hot formed by reheating the material into the supercooled liquid temperature region where the material is formed under isothermal conditions, such that the amorphous stage relaxes into a highly viscous metastable liquid that can be formed under applied pressure. Under isothermal conditions, the formability of the amorphous metal alloy increases with increasing processing temperature. Thus, the highest isothermal formability can be achieved at the highest possible processing temperature, so long as crystallization can be avoided.

The ability of an amorphous metal alloy to be thermoplastically formed is described by its formability a parameter which is directly related to the interplay between the temperature dependent viscosity and time for crystallization. Crystallization has to be avoided during TPF of an amorphous metal alloy since it degrades the amorphous metal alloy's properties and retards its formability. Therefore, the total time elapsed during TPF of the amorphous metal alloy must be shorter than the time to crystallization.

Surprisingly the low viscosities that can be reached in the SCLR in some BMGs are sufficiently low that the pressure generated by the surface tension alone is sufficient to deform the BMG. In other words when the BMG is heated into the SCLR under appropriate processing conditions it reduces its surface area, as a cause it gives smooth surface. This for example enables to erase (locally or globally) features such as dots on the surface. In addition, it can be utilized to smooth the surface of final parts. Amorphous metal alloy materials and liquids also show very different temperature dependencies of the viscosity and surface tension. Surface tension typically shows a linear temperature dependence whereas viscosity shows an exponential dependence. Therefore, the ratio of surface tension force/viscous force increases with increasing temperature.

Imprint lithography has become an emerging lithographic technique that promises high throughput patterning of nanostructures on large areas. Various imprint lithography methods have been proposed, as described for example in U.S. Pat. No. 5,772,905 to Chou, the subject matter of each of which is herein incorporated by reference in its entirely. Based on the mechanical embossing principle of a polymer, imprint lithography can achieve pattern resolutions beyond the limitations set by the light diffractions or beam scattering in other conventional techniques.

At the core of the imprint lithography technology is the development of imprint material, which traditionally have included polymer materials with a low glass transition temperature (i.e., a $T_g$ of less than about 105° C.), such as poly (methyl methacrylate) PMMA, given by way of example and not limitation. However, this imposes several major limitations to further improvement of current imprint lithography techniques, including (1) short useful lifetime of the mold; (2) low printing speed; and (3) solubility of the imprint media in organic solutions.

Lifetime of mold: nanoimprint molds presently require replacement after approximately 50 consecutive imprints. Heating and cooling cycles and high pressure (approximately 50-130 bar), applied during embossing, produce stress and wear on the nanoimprint molds.

Printing speed: the low thermal conductivity of polymeric materials (i.e., thermal conductivity of about 0.2 W/m-K) limits the thermal cycling of the substrate to one imprint per 10 minutes.

Solubility of imprint media: the imprint media are soluble or swellable in organic solutions, which prevents further cleaning or repairing of patterned substrates.

Thus, it would be desirable to develop a new imprint technique based on non-polymeric materials. The inventors of the present invention have determined that amorphous metal materials based on bulk metallic glasses (BMG) can be formed into features below about 10 nm. These BMG offer very unique physical properties suitable for nanoprinting. For example, these BMG materials demonstrate thermal conductivity of about 7 W/m-K, which is low for a metal. Typically metals have a thermal conductivity in excess of about 20-450 W/m-K. This low value of thermal conductivity allows for adiabatic heating of (intimate vicinity of patterned feature) in a serial imprinting process. In addition, as compared to the thermal conductivity of polymeric materials, which generally runs at about 0.2 W/m-K, the thermal conductivity for amorphous metals is significantly larger, which is highly beneficial for the reduction in the thermal cycle time in a parallel imprinting process.

SUMMARY OF THE INVENTION

It is an object of the present invention to provide a method of imprinting microfeatures or nanofeatures into an amorphous metal alloy layer.

It is another object of the present invention to provide various means of transferring a pattern into an amorphous metal alloy layer.

It is still another object of the present invention to use amorphous metal alloys as both mold materials and as imprint materials.

It is still another object of the present invention to provide a method of erasing a pattern or features formed in a surface of an amorphous metal alloy substrate.

It is still another object of the present invention to provide a means for imprinting a new pattern into a previously erased substrate.

It is still another object of the present invention to enable an amorphous metal substrate to be imprinted and erased multiple times.

It is still another object of the present invention to provide a method of locally repairing a locally damaged amorphous alloy substrate.

To that end the present invention relates generally to a method of imprinting microfeatures or nanofeatures into an amorphous metal alloy layer, the method comprising the steps of:

a) heating an amorphous metal alloy layer to a temperature within a supercooled liquid region of the amorphous metal alloy to soften the amorphous metal alloy layer;

b) transferring a pattern into the softened amorphous metal alloy layer; and c) cooling the amorphous metal alloy to a temperature below the supercooled liquid temperature region of the amorphous metal alloy to resolidify the amorphous metal alloy layer.

The present invention also relates generally to a method of repairing a locally damaged amorphous metal alloy substrate having a pattern imprinted therein, wherein the pattern imprinted therein contains a damaged portion, the method comprising the steps of:

a) locally heating the damaged portion of the imprinted pattern to a temperature within the supercooled liquid temperature region of the amorphous metal alloy, whereby the amorphous metal alloy locally softens in the damaged area;

b) maintaining the amorphous metal alloy within the supercooled liquid temperature region of the amorphous metal alloy, whereby surface tension causes the pattern in the locally softened region of the amorphous metal alloy to smooth or erase;

c) locally imprinting the smoothed or erased portion of the damaged amorphous metal alloy substrate to recreate the pattern in the damaged portion of the substrate; and d) cooling the amorphous metal alloy substrate to a temperature below the supercooled liquid temperature region of the amorphous metal alloy to resolidify the amorphous metal alloy substrate.

The present invention also relates generally to a method of erasing a pattern formed in a surface of an amorphous metal alloy substrate, the method comprising the steps of:

a) providing an amorphous metal alloy substrate having a pattern formed therein;

b) heating the amorphous metal alloy substrate to a temperature within the supercooled liquid temperature region of the amorphous metal alloy for a period of time to soften the amorphous metal alloy, whereby the pattern formed in the amorphous metal alloy substrate is smoothed or erased.

It is a feature of the invention that surface roughness of amorphous metal alloy substrates is smoothened by heating the amorphous metal into the supercooled liquid region and roughness is smoothened under the action of the surface tension alone.

Furthermore, in order to create a homogeneous smooth surface and when shaping the part, it is generally preferable to choose an initial shape which is formed into the final shape that exceeds the area of interest (i.e., the area that should be homogeneously smooth), as seen in FIG. 10.

BRIEF DESCRIPTION OF THE DRAWINGS

For a fuller understanding of the invention, reference is had to the following description taken in connection with the accompanying figures, in which.

Also, while not all elements are labeled in each figure, all elements with the same reference number indicate similar or identical parts.

DETAILED DESCRIPTION OF THE PREFERRED EMBODIMENTS

Figure 1:
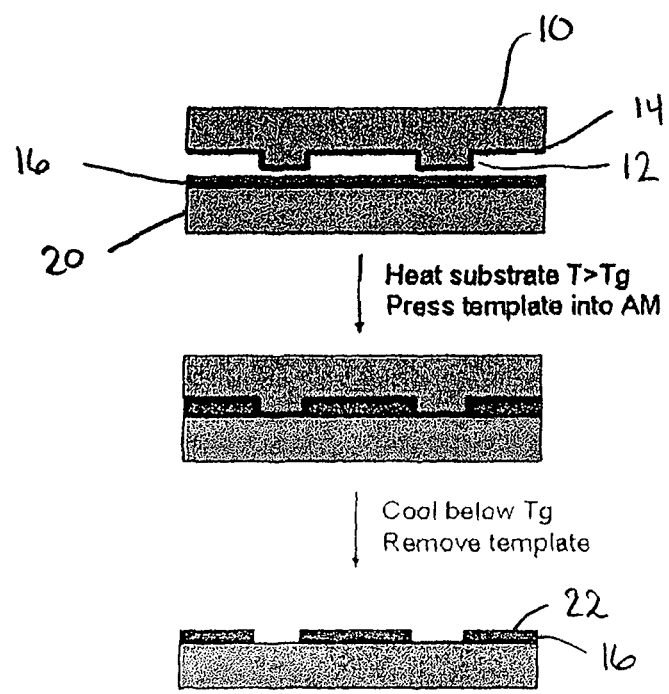
FIG. 1 is a schematic of an imprinting process in accordance with one embodiment of the present invention.

In one embodiment, the present invention relates generally to a method of imprinting microfeatures or nanofeatures into an amorphous metal alloy layer, the method comprising the steps of:

a) heating an amorphous metal alloy layer to a temperature within a supercooled liquid region of the amorphous metal alloy to soften the amorphous metal alloy layer;

b) transferring a pattern into the softened amorphous metal alloy layer; and c) cooling the amorphous metal alloy to a temperature below the super cooled liquid temperature region (which temperature is also below the glass transition temperature of the amorphous metal alloy) to resolidify the amorphous metal alloy layer.

In one embodiment of the invention, the step of transferring the pattern into the softened amorphous metal alloy layer comprises:

a) pressing a mold having a desired pattern disposed thereon into the softened amorphous alloy layer to transfer the pattern into the amorphous softened metal alloy layer; and b) removing the mold from the amorphous metal alloy layer once the amorphous metal alloy layer has cooled to a temperature below the supercooled liquid temperature region of the amorphous metal alloy, whereby the pattern is transferred from the mold to the amorphous metal alloy layer.

In addition, the amorphous metal layer alloy is preferably disposed on a substrate. While the substrate is not critical to the process of the present invention, typical substrate materials include silicon, quartz, alumina, and NiW given by way of example and not limitation.

The amorphous metal alloy is typically selected from the group consisting of platinum-based, zirconium-based, iron-based, palladium-based, copper-based, nickel-based, cerium-based, gold-based and combinations of one or more of the foregoing. In a preferred embodiment, the amorphous metal alloy is platinum-based, zirconium-based or gold-based.

The mold is typically fabricated from a material selected from the group consisting of carbon, alumina, quartz, polymers, silicon, aluminum, brass, pyrolized carbon, amorphous metal alloys, and combinations of one or more of the foregoing. In one embodiment, the mold comprises a release layer disposed thereon, wherein the release layer contacts the amorphous metal alloy layer being imprinted. The composition of the release layer is not critical to the process of the invention but is typically selected from the group consisting of oxide, nitride, and silane-based materials, which are generally well known in the art.

In one embodiment, the mold material is an amorphous metal alloy and the amorphous metal alloy used for the mold has a higher glass transition temperature than the amorphous metal alloy being imprinted. For example, the mold material may comprise a zirconium-based amorphous metal alloy and the amorphous metal alloy layer being imprinted may comprise a gold or platinum-based amorphous metal alloy. It is also noted that if the mold is fabricated from a polymer, the polymer is typically SU8 and works best with gold-based amorphous alloys due to processing temperature.

In a preferred embodiment if two different amorphous metal alloys are being used for the mold material and for the imprint layer, it is generally preferred that the difference in the glass transition temperature between the amorphous metal alloy of the mold and the amorphous metal alloy layer being imprinted is at least about 30° C., more preferably, at least about 50° C.

This can also be accomplished with the same amorphous metal, where the mold material is a crystalline version of the BMG and the pattern is replicated with the same BMG at a temperature in its supercooled liquid region. The amorphous mold is created by the process described herein and subsequently crystallizes by temperature exposure beyond its crystallization time. This aspect of the invention is shown in FIGS. 7(a) and 7(b) in which FIG. 7(a) depicts an SEM image of a nano-template fabricated by TPF of a platinum-based BMG and FIG. 7(b) depicts an SEM image of a platinum-based BMG that was thermoplastically formed over the crystallized template shown in FIG. 7(a). FIGS. 7(a) and 7(b) show that the same BMG can be used as a mold for itself after crystallization.

The step of cooling the amorphous metal alloy layer typically comprises cooling the amorphous metal alloy layer to approximately room temperature. In a preferred embodiment, the amorphous metal alloy is slow cooled to room temperature at a rate of about 0.5° C./second.

In another embodiment of the invention, the step of transferring the pattern into the softened amorphous metal alloy layer comprises the steps of:
  a) providing a scanning probe having a sharp tip;
  b) heating the tip of the scanning probe to a suitable processing temperature; and
  c) pressing the tip into the softened amorphous metal alloy layer to provide a series of indentations in a desired pattern in the amorphous metal alloy layer.

The scanning probe is typically selected from the group consisting of nano-indentators and atomic-force microscope cantilevers. In addition, the processing temperature of the scanning probe is typically a temperature at which a pressure generated by the tip exceeds a flow stress of the amorphous metal alloy being patterned.

In one embodiment, the indentation provided in the amorphous metal layer have an aspect ratio of about 1.

Furthermore, to create multiple indentations in the amorphous metal layer, the tip is serially pressed into the softened amorphous metal alloy layer for an indentation time of about $10^{-3}$ seconds each time.

In another embodiment, the present invention relates generally to a method of repairing a locally damaged amorphous metal alloy substrate having a pattern imprinted therein, wherein the pattern imprinted therein contains a damaged portion, the method comprising the steps of:
  a) locally heating the damaged portion of the imprinted pattern to a temperature within the supercooled liquid temperature region of the amorphous metal alloy, whereby the amorphous metal alloy locally softens in the damaged area;
  b) maintaining the amorphous metal alloy within the supercooled liquid temperature region of the amorphous metal alloy, whereby surface tension causes the pattern in the locally softened region of the amorphous metal alloy to smooth or erase;
  c) locally imprinting the smoothed or erased portion of the damaged amorphous metal alloy substrate to recreate the pattern in the damaged portion of the substrate; and
  d) cooling the amorphous metal alloy substrate to a temperature below the supercooled liquid temperature region of the amorphous metal alloy to resolidify the amorphous metal alloy substrate.

In still another embodiment, the present invention relates generally to a method of erasing a pattern formed in a surface of an amorphous metal alloy substrate, the method comprising the steps of:
  a) providing an amorphous metal alloy substrate having a pattern formed therein;
  b) heating the amorphous metal alloy substrate to a temperature within the supercooled liquid temperature region of the amorphous metal alloy for a period of time to soften the amorphous metal alloy,
  whereby the pattern formed in the amorphous metal alloy substrate is smoothed or erased.

In one embodiment, the substrate is a mold having rough portions thereon and heating the substrate to the temperature within the supercooled liquid temperature region of the amorphous metal alloy provides the required kinetics to smooth the mold.

The time required to erase the features on the substrate depends on the height and aspect ratio of the features but is typically in the range of about 0.1 to about 20 seconds. The features typically have an aspect ratio of less than about 1 and a height of less than about 100 nm.

Thereafter, once the pattern has been erased a new pattern can be imprinted into the amorphous metal alloy by the process described above. The erasing and patterning steps can be performed multiple times until the crystallization sets in.

In one embodiment, the surface tension of the heated amorphous metal alloy substrate is approximately 1 N/m.

As discussed above, a large range of amorphous metals can be used in the present invention and suitable materials include, for example platinum-based, zirconium-based, iron-based, palladium-based, cerium-based, gold-based amorphous metal alloys, given by way of example and not limitation. The processing temperature range permitted by these materials is typically within the range of about 60 to about 450° C. In contrast, polymer materials generally offer only a very narrow processing range.

Amorphous metals also distinguish themselves from crystalline metal materials because of their high strength, which is also reflected in their very high surface hardness (e.g., 600 HV for a zirconium-based amorphous metallic material. Since wear resistance correlates with surface hardness, one can expect a long lifetime, in particular when using amorphous metal materials as a mold material.

Even though the hardness of <100> single crystal silicon is about 1200 HV, the lack of ductility of silicon makes it prone to shatter and thereby wear significantly. Particularly, amorphous metals in small dimensions exhibit ductile behavior, which makes them ideal materials for mold applications together with their unusually high hardness.

Furthermore, amorphous metallic materials can be cleaned with most chemical etchants and solvents, including potassium hydroxide, hydrofluoric acid, acetone/alcohol, xenon difluoride, sulfuric acid and phosphoric acid, given by way of example and not limitation.

A schematic diagram of nano-imprint lithography with amorphous metals using a parallel printing process is shown in FIG. 1. The writing/forming step takes place at a temperature that is within the supercooled liquid temperature region (SCLR) of the amorphous metal.

In the SCLR, the amorphous metal exists as a viscous metastable liquid which can be plastically formed under an applied pressure. In this temperature region, the amorphous metal first relaxes into a metastable liquid before it eventually crystallizes. For various amorphous metals, the processing window given by the supercooled liquid temperature region permits processing times in the range of about 1 second to about 100 minutes, where the Newtonian viscosity is about $10^4$ to about $10^9$ Pa·s.

At typical thermoplastic forming (TPF) temperatures and strain rates, the deformation of BMGs can be described by Newtonian flow $$\sigma = 3\eta \frac{d\varepsilon}{dt} \quad (1)$$

where σ is the flow stress, η the viscosity, and ε is the strain. For example, at a viscosity of $10^7$ Pa·s which is accessible for a wide range of amorphous metal alloys, deformation of more than 100% under an applied pressure of 1 MPa can be achieved within 30 s. Because such low forming pressures are attainable, TPF has even been utilized to blow mold metallic glass with the pressure created with the force exerted by the human lung alone. The pressure exerted by the surface tension can also be sufficient to alter the shape of BMG parts when processed in the supercooled liquid region using surface tension equal to approximately 1 N/m, a typical value for amorphous metal alloys, to erase features with different length scales imprinted on a BMG. Under optimized annealing conditions, the surface tension can also be used to smooth the surface roughness of BMG components without noticeably altering their shapes.

To transfer a pattern from a mold into a thin film of BMG amorphous metal, the amorphous metal must first be heated into the SCLR. Depending on the amorphous metal alloy used, the processing temperature is between about 60 and about 450° C.

As seen in FIG. 1, a master mold 10 with a relief template 12 and having a release layer 14 thereon, is pressed into an amorphous metal film 16 on a substrate 20. The amorphous metal film 16 is heated to a temperature above the glass transition temperature for the amorphous metal alloy and within the supercooled liquid temperature region for the amorphous metal alloy. The resulting "sandwich" is cooled to below room temperature and the relief template 12 is removed, leaving a pattern 22 in the amorphous metal alloy layer 16.

Figure 2:
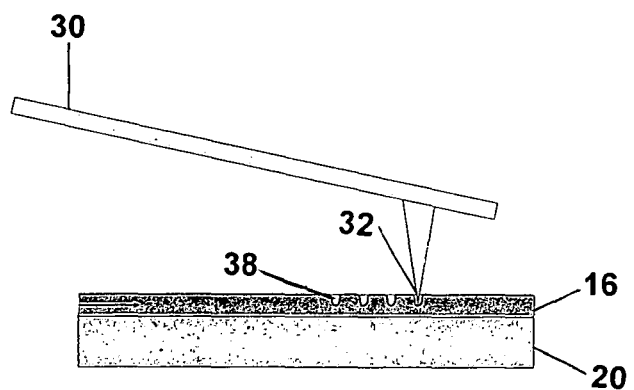
FIG. 2 is a schematic of an imprinting process in accordance with another object of the present invention.

The serial indentation lithography process utilizes a scanning probe technique, which provides a versatile method for serial patterning of thin film amorphous metal materials. A schematic of this process is shown in FIG. 2. As seen in FIG. 2, the scanning probe 30 comprises a heated tip 32 which contacts the amorphous metal layer 16 on the substrate 20, which forms a series of indentations 38 in the amorphous metal layer 16.

For example, a sharp tip of about 1 to about 10 nanometer dimension can be pressed into the amorphous metal that has been heated to a temperature in the SCLR on a time scale of about 10 μs. For the nano-imprinting, the tip is maintained at a predetermined temperature $T_{process}$, which is chosen such that the pressure generated by the tip exceeds the flow stress of the amorphous metal at this temperature give by $\sigma_{flow}=\eta\times 3\varepsilon$, wherein η is viscosity and ε is strain rate. The aspect ratio of the indent (~1) and the indenting time of ~$10^{-3}$ seconds defines the strain rate to about $10^3$ sec$^{-1}$. For example, with a forming pressure of 40 MPa available, the required viscosity is $10^3$-$10^4$ Pa·s.

Amorphous metals are also known to change their flow behavior from Newtonian to non-Newtonian under an increase of strain rate. At the strain rate of $10^3$ sec$^{-1}$, the viscosity drops significantly and a value even below $10^3$ Pa·s can be reached.

Figure 3:
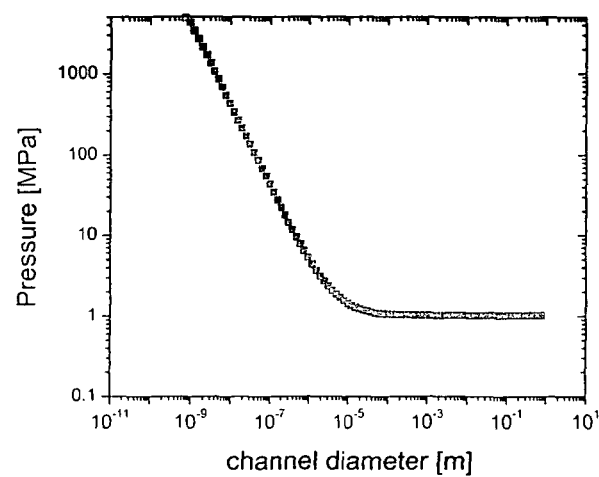
FIG. 3 is a graphical representation of the relationship between forming pressure and feature size.

As discussed above, the patterns formed in the amorphous metal can be erased by reprocessing the amorphous metal in the SCLR. The driving force for erasing, i.e., smoothing of the pattern is surface tension. FIG. 3 shows the dependence of the required forming pressure on the size of the pattern for a constant aspect ratio. The surface tension becomes the dominant force for features having a size below ~1 micron.

Thus, by reheating a pattern, the "stored" driving force smoothes the surface. The erasing process temperature is within the SCLR. The required time for this process depends strongly on temperature and as the temperature increases, a faster smoothening time evolves. Erasing can also be carried out in both a serial and a parallel process. In a parallel erasing, speed is less critical than in a serial process, thus it would typically be carried out at a lower temperature, a higher viscosity and a larger time window.

The temperature region where the viscosity is low enough that it can be overcome by the applied load provides in various amorphous metals a processing time of several hundred seconds. Because the time spent in the SCLR due to the nature of the crystallization mechanism is cumulative, up to about $10^8$ write and erase cycles can be performed.

Amorphous metals are also excellent materials for use as a master in a molding process. The hardness of amorphous metals exceeds that of most metallic alloys, which results in a high wear resistance.

Amorphous metal alloys of different material compositions have glass transition temperature spanning a wide range, which can extend from about 60 to about 450° C. or more. While those amorphous metal alloys having lower glass transition temperatures, such as gold-based and platinum-based are suitable for imprint media, the higher $T_g$ materials are suitable for making lower volume copies of a master mold. This unique combination enables a new paradigm of nano-manufacturing processes through a two-step mask making and printing process.

Figure 4:
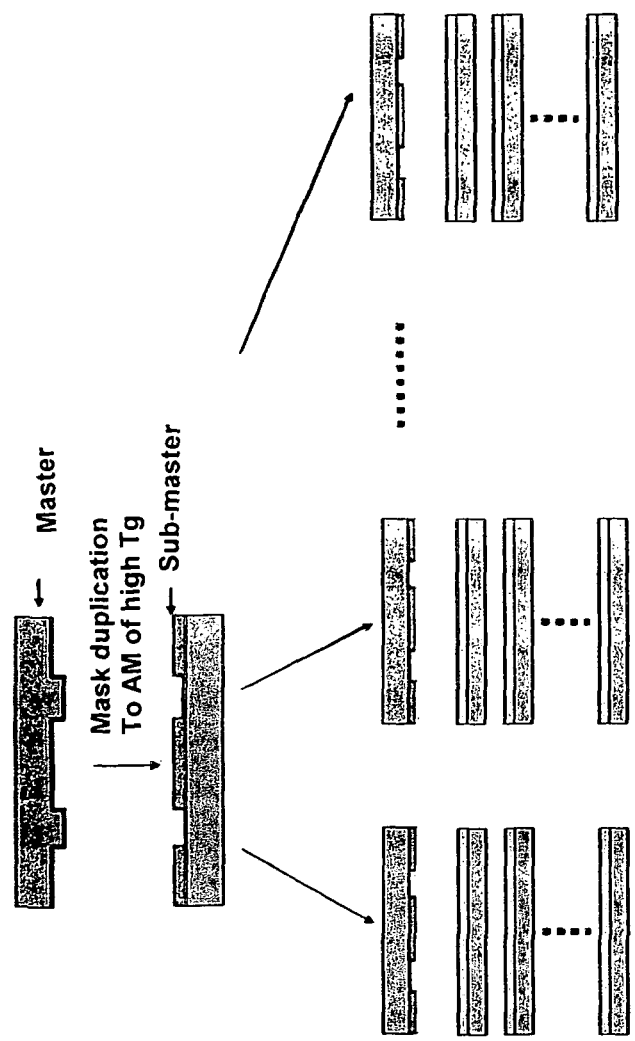
FIG. 4 is schematic of a two-step imprint nanomanufacturing process in accordance with the present invention.

As set forth in FIG. 4, first, the master mold is replicated to an amorphous metal alloy film of high $T_g$ through a lower speed high temperature embossing process. Thereafter, the sub-master amorphous metal alloy mold will be used at a lower temperature for direct printing on substrates coated with low $T_g$ amorphous metal alloy materials.

The present invention can be used for low cost imprint applications, such as high density storage, memory, flat panel display, high aspect ratio patterning applications, such as X-ray LIGA lithography fabrication, hard-drive write head fabrication and other similar applications, by way of example and not limitation. The present invention allows both writing and erasing and can be repeated multiple times.

In the example of amorphous metal molds, the mold can be prepared by replication from a different material master or from a different amorphous metal master.

In the example of data storage, the size to which the amorphous metal can be formed allows one to achieve very high data density. For example, grid size reduction from CD media (0.83 μm) to DVD media (0.4 μm) allows for a 7-fold increase in data storage capacity. Amorphous metal disks have the potential to scale down the grid size to below 50 nm, yielding a 300 GB capacity disk media.

Figure 5:
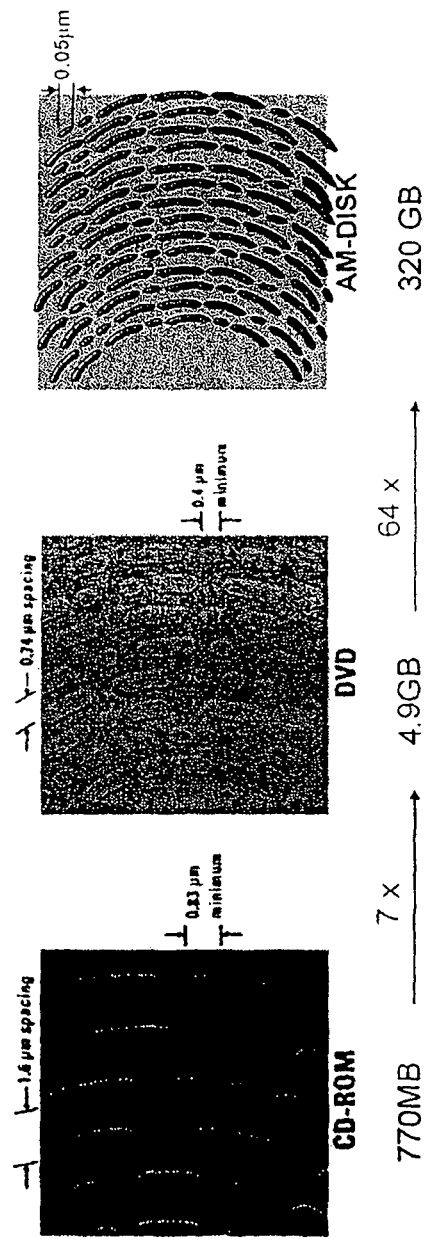
FIG. 5 depicts various data storage media and the storage capacity of these media.

Various data storage media and the storage capacity of these media are depicted in FIG. 5.

It has been shown that for various forming techniques that the ability to replicate features is outstanding and the limit that can be expected is for feature sizes about 10 nm. Therefore, the limiting factor in the precision and surface finishing for thermoplastic forming of amorphous metal alloys is often given by the precision and surface finish of the mold. In particular, for micro- and nano-size features, often times the mold roughness rises to an unacceptable value for precision applications. For example, typical for silicon molds created by deep reactive ion etching is a scalloping pattern which results in a roughness of $R_A \sim 250$ nm. For e-beam lithography and the LIGA process as mold making processes, the surface roughness is reduced, but the cost to create these molds prevents most commercial applications.

Thus, there is a need for an improved and cost effective method for making micro-scale components with a smooth surface. As a consequence of the low viscosity of an amorphous metal alloy in its SCLR, small forces are sufficient to deform the amorphous metal alloy in its SCLR. Even a surface tension of about 1 N/m for most amorphous metal materials is sufficient to deform the material and thereby smoothen the surface on a time scale below the crystallization kinetics of the amorphous metal alloy.

Figure 6:
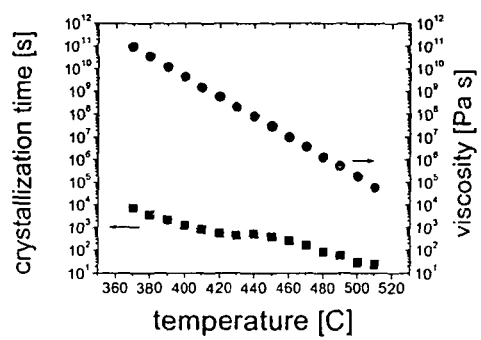
FIG. 6 depicts viscosity as a function of temperature for a zirconium-based amorphous metal alloy.

An example of the availability time for this process, limited by the time to reach crystallization, and the viscosity as a function of temperature for a Zr-based amorphous metal alloy is shown in FIG. 6. This diagram reveals a large processing window including times from 30 seconds to 10 minutes at a viscosity of $10^8$ Pa·s to $10^5$ Pa·s.

Figure 7:
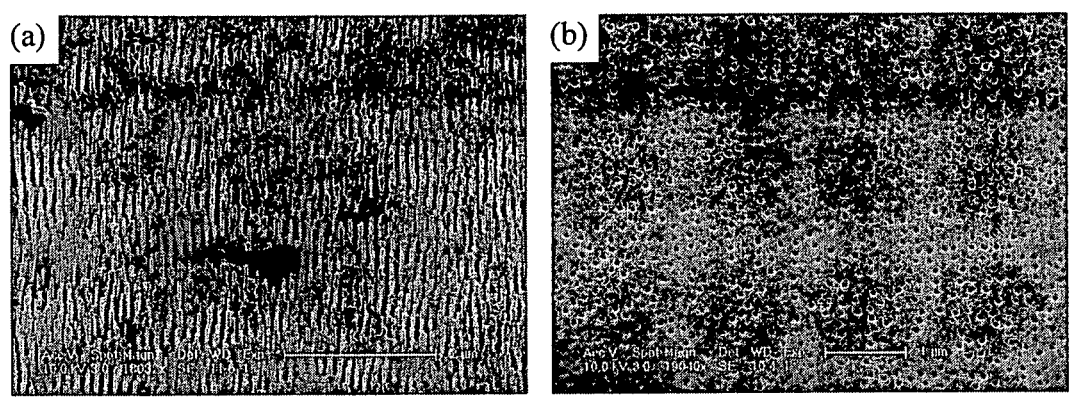
FIG. 7(a) depicts a SEM image of a nano-template fabricated by TPF of a platinum-based BMG.
FIG. 7(b) depicts a SEM image of a platinum-based BMG that was thermoplastically formed over the crystallized template shown in FIG. 7(a).

An example of the smoothening method is shown in FIG. 7, where the left hand side shows a TPF amorphous metal alloy with a surface roughness of $R_A \sim 250$ nm. After a thermal treatment at a temperature which is in the SCLR of this particular amorphous metal alloy, the roughness can be reduced as shown on the right hand side.

The kinetics of smoothening can be controlled by the processing temperature that has a strong effect on viscosity. Since the surface tension forces affect not only the roughness on the surface but also the geometry of the part itself, a significant difference in typical length scale between the roughness and the typical dimension is essential. In one embodiment, at least an order of magnitude between those two length scales is required to result in a desired smoothening affect and at the same time to have a negligible effect on the dimensional accuracy. FIGS. 7(a) and 7(b) demonstrates the smoothening effect during a thermal treatment in the SCLR of the amorphous metal alloy. FIG. 7(a) shows a BMG with a surface roughness of about 250 nm and FIG. 7(b) shows the roughness reduced by a thermal treatment step where the amorphous metal alloy was reheated into the SCLR.

The properties of amorphous metal alloys such as high hardness and wear resistance are beneficial for a mold material. The above described smoothening process step can be used to create a high precision high surface finished mold. This process is depicted in FIGS. 8(a)-8(d). Here, a mold (FIG. 8(a)) is replicated with an amorphous metal alloy (FIG. 8(b)). Then, a smoothening step is applied where the amorphous metal alloy is not in physical contact with the mold (FIG. 8(c)). The smoothened part shown in FIG. 8(c) is sued as a mold for the replication with other materials that are shown having different softening characteristics (FIG. 8(d)). If, for example, another amorphous metal alloy is used to replicate the mold, its softening characteristics are chosen to be different from the amorphous metal alloy used for the mold, which is reflected in the glass transition temperature. In one embodiment, a difference in $T_g$ of at least about 50° C. is sufficient, and for some applications, a difference in $T_g$ of as low as about 20° C. can be used.

Figure 8:
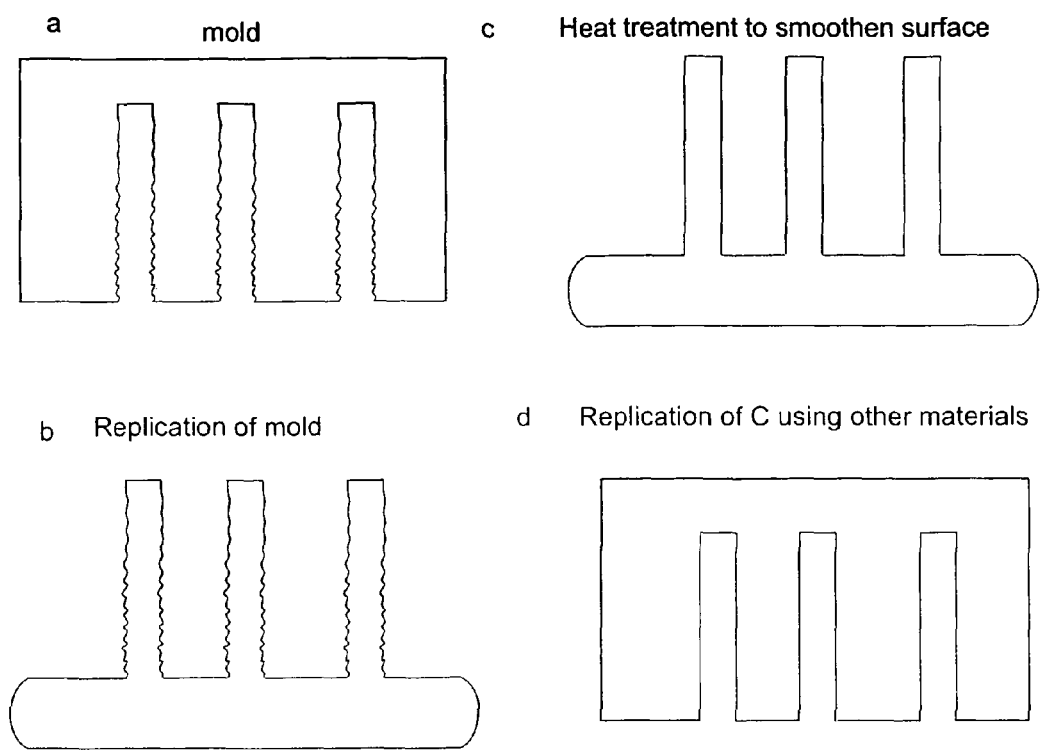
FIGS. 8(a)-(d) depict a process to crate high precision, high surface finished parts.
Figure 9:
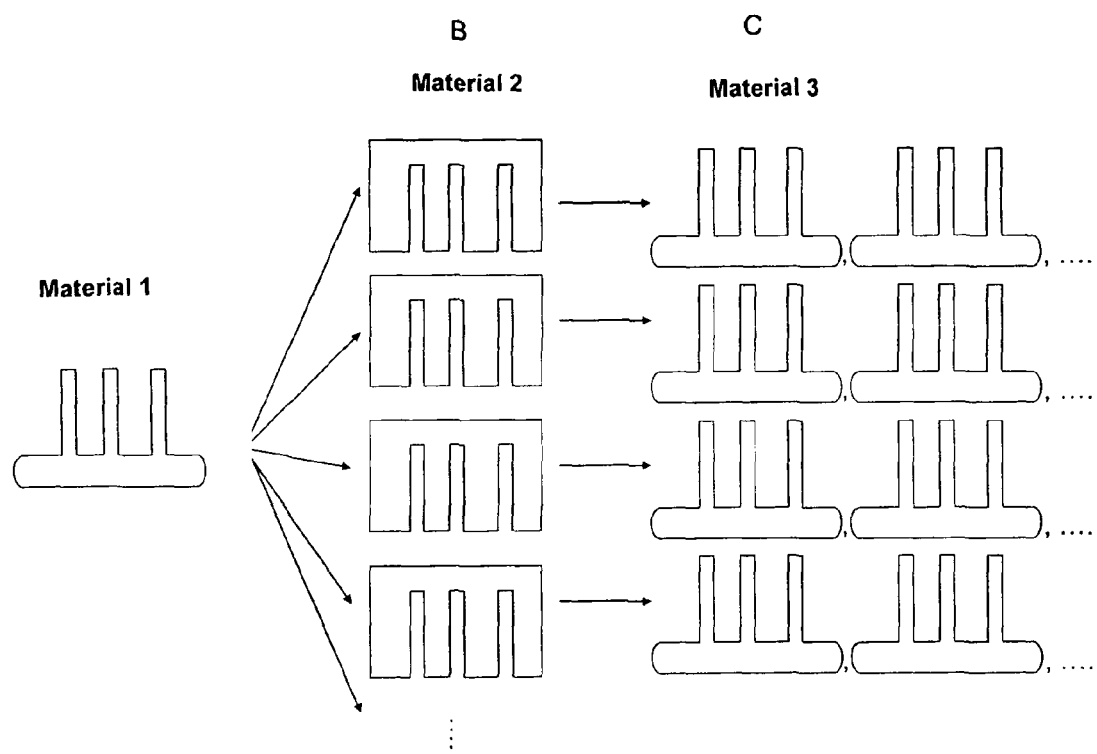
FIGS. 9(a)-(c) depict a method for mass production of high precision, high surface finished parts.

The method described in FIG. 8 can be extended to a mass scale production process as seen in FIG. 9. Herein a "master mold" is used which is made by the process described in FIGS. 8(a)-(d). Using an amorphous metal alloy with a different softening behavior, the mold is replicated into negative copies. These copies are subsequently used as a mold for the production of the final part. The material used for the final part may include amorphous metal alloys with a different softening behavior than used for the previous steps.

Figure 10:
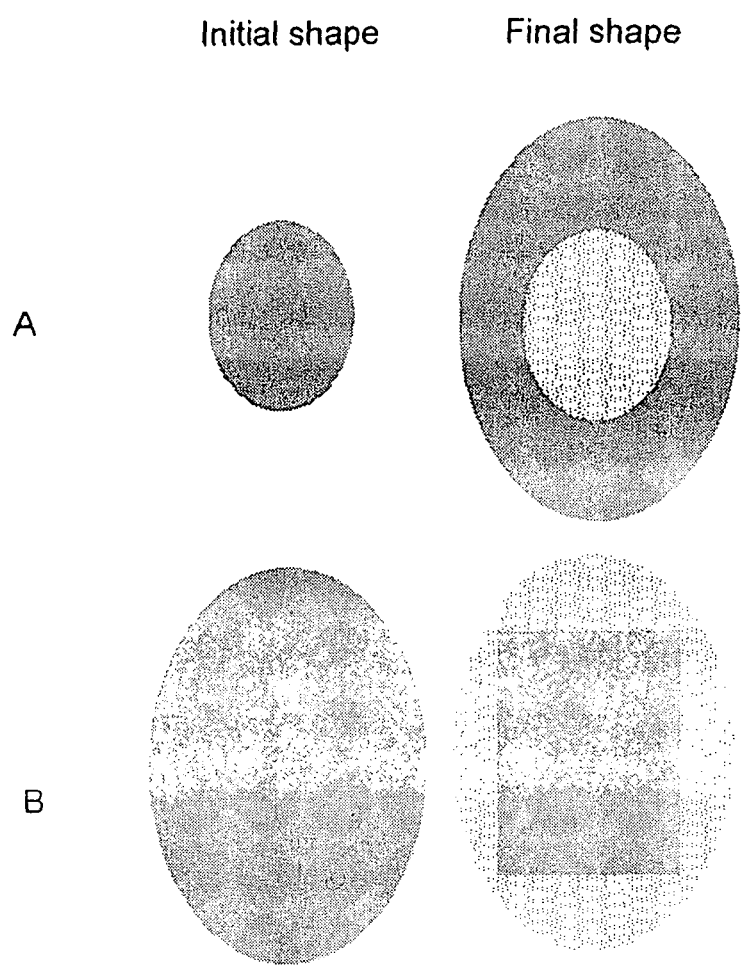
FIG. 10 depicts the relationship between initial shape and final shape for achieving a uniform appearance of the surface in the final part.

Furthermore, during TPF with amorphous metal alloys, it has been found that the surface finish depends on the position relative to the initial shape. This is demonstrated in FIGS. 10(a) and (b). If as sketched in FIG. 10(a) the initial shape of the amorphous metal material is smaller than the final shape, a non-uniform appearance will result where in the final part, indications of the initial part are still visible. A uniform appearance can only be achieved if the initial shape exceeds that of the final shape as shown in FIG. 10(b). Thus it can be seen that the surface smoothening process of the invention can be used to create smooth surfaces with a uniform appearance.

In one example of the invention, $Pt_{57.5}Cu_{14.7}Ni_{5.3}P_{22.5}$ was selected as the amorphous metal alloy based on its outstanding formability. Glass transition, crystallization temperature, and fragility parameter for this particular alloy are 230° C., 310° C., and $d^*=16.4$, respectively.

In order to produce an experimental sample, micro-indents of varying sizes were imprinted on $Zr_{44}Ti_{11}Cu_{10}Ni_{10}Be_{25}$ amorphous metal alloy which was used as a die. The die pattern was then transferred onto a sample of $Pt_{57.5}Cu_{14.7}Ni_{5.3}P_{22.5}$ amorphous metal alloy by TPF in air at 250° C. under an applied pressure of 100 MPa. As shown in FIG. 6, pyramidal features with varying dimensions were imprinted on the $Pt_{57.5}Cu_{14.7}Ni_{5.3}P_{22.5}$ after releasing it from the die.

In order to explore erasure of the features using surface tension forces, the samples were subsequently annealed in the supercooled liquid region and the change in height of the features as a function of annealing time was measured using a scanning electron microscope (SEM).

Figure 11:
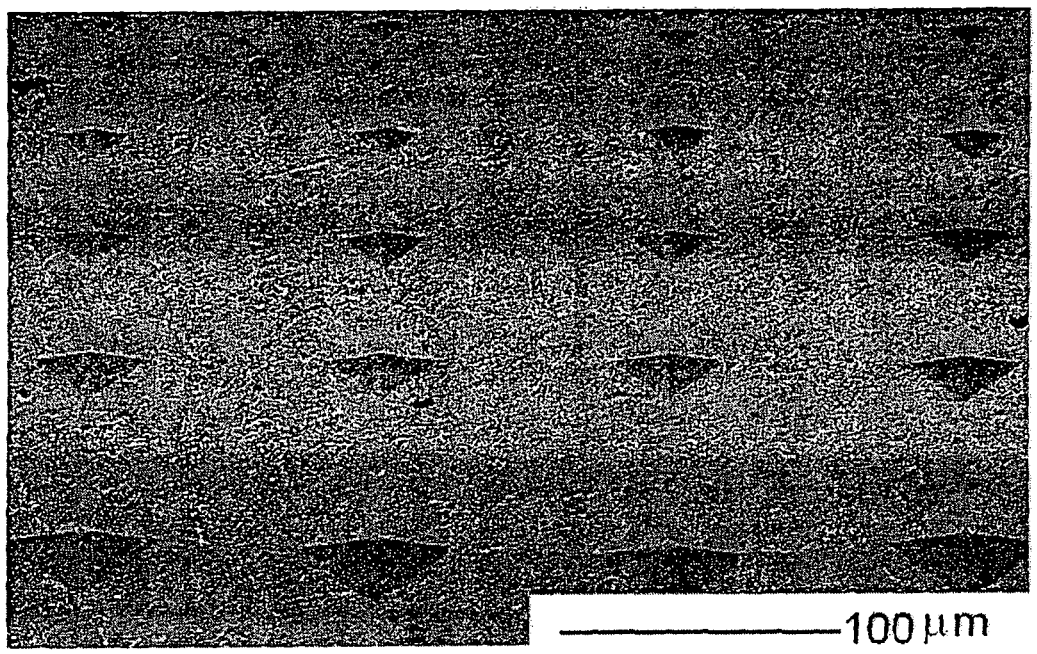
FIG. 11 depicts a SEM image of pyramid-shaped microfeatures on the surface of $Pt_{57.5}Cu_{14.7}Ni_{5.3}P_{22.5}$ BMG. The features are transferred from $Zr_{44}Ti_{11}Cu_{10}Ni_{10}Be_{25}$ BMG by thermoplastic forming at 250° C. for 20 seconds under a pressure of 100 MPa.

FIG. 11 shows SEM images of two different features, one with a base width of 28 µm and the other 8 µm in the as-printed state and after annealing at 270° C. for 60, 300, and 1200 seconds. A significant change in shape and height of the features can be observed already after 60 seconds, and this effect is more pronounced in the smaller feature. Upon further annealing the features continue to decrease and merge into the base metallic glass, and after 1200 seconds each feature is effectively erased. The onset of crystallization for $Pt_{57.5}Cu_{14.7}Ni_{5.3}P_{22.5}$ at 270° C. was determined by thermal analysis to occur at 1200 seconds.

FIG. 11 shows that the smallest feature with an initial height of 2 µm has been completely erased after annealing for 1200 seconds. The largest feature shows a reduction in height from 6 µm initially to 2 µm after annealing for 1200 seconds.

Figure 12:
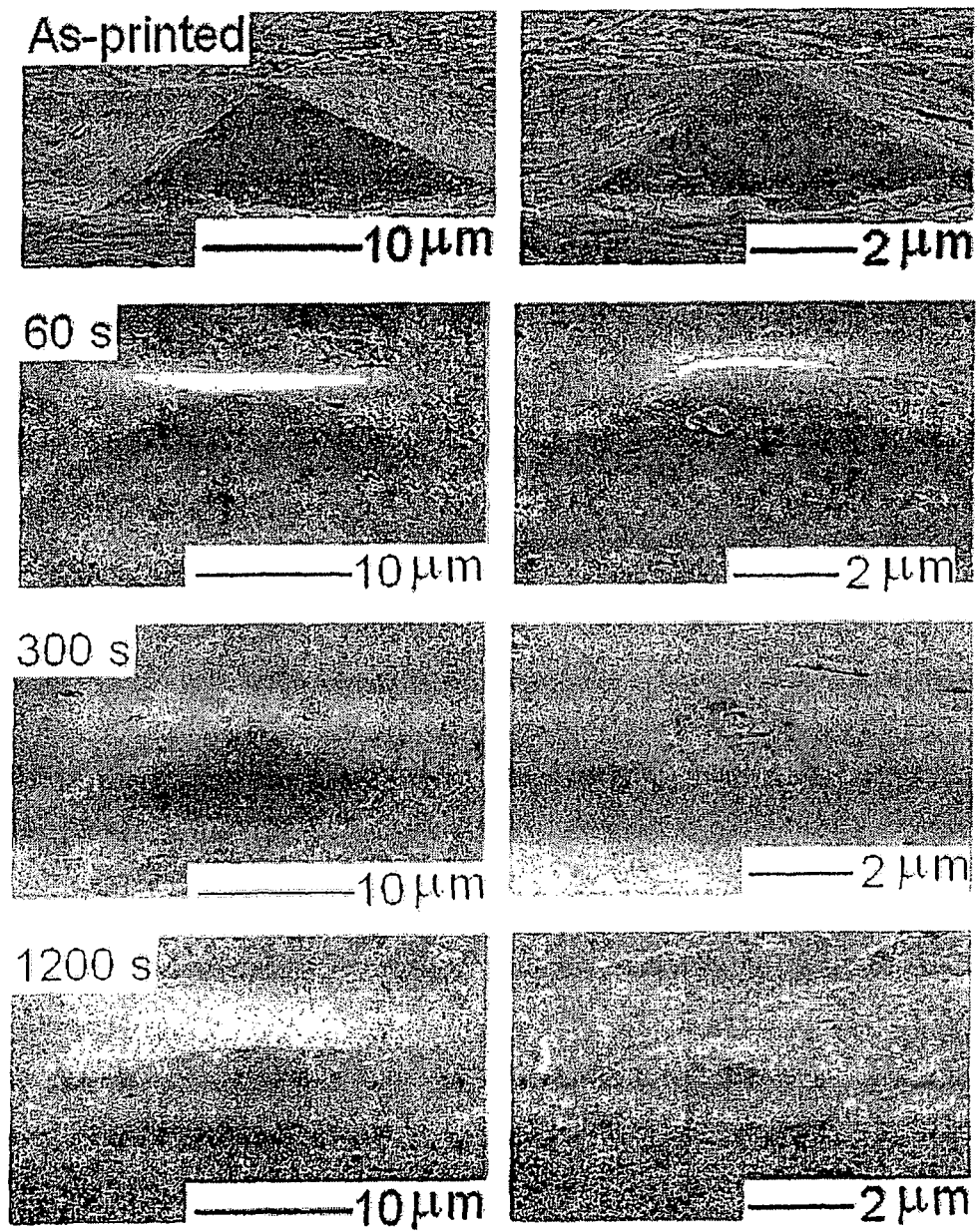
FIG. 12 depicts SEM images of two different microfeatures after annealing at 270° C. for 60 seconds, 300 seconds, and 1200 seconds. The 6 µm feature is completely erased after 1200 seconds, whereas the height of the large feature is significantly reduced.

In order to calculate the erasing kinetics we treat for simplicity the pyramidal features as hemispherical protrusions on the surface of an amorphous metal alloy. Inset of FIG. 12 shows the schematic time evolution of such protrusions during annealing above $T_g$ where the low viscosity allows the amorphous metal alloy to flow in response to surface tension. The height of the protrusions decreases from $h_0$ to $h$ after annealing for t. The average radius of the protrusions at any time t can be estimated as $$\frac{h_o^2}{h},$$

where $h_o$ is the initial height and h is the height after annealing for t. The stress exerted by the surface tension $\gamma$ on the radius r can be estimated as $$\sigma = \frac{\gamma}{r} = \frac{\gamma h}{h_o^2} \quad (2)$$

Since the only stress acting on the protrusions is due to the surface tension the expressions for stress (eq. 2) and strain ($\epsilon = dh/h_o$) can be substituted into Eq. (1) which yields $$\frac{\gamma h}{h_o^2} = 3\eta \frac{d\epsilon}{dt} = -3\eta \frac{1}{h_o} \frac{dh}{dt} \quad (3)$$

$$\Rightarrow \frac{dh}{dt} = -\frac{\gamma h}{3\eta h_o} \quad (4)$$

The negative sign in Eq. (3) appears because the height decreases with increasing time. Eq. 4 is a differential equation that can be solved for time dependence of height h $$h(t) = h_o e^{-\frac{\gamma}{3\eta h_o}t} \quad (5)$$

FIG. 8 shows the experimental values of height as a function of annealing time along with the fitted results (dashed line) obtained using Eq. (5) for three differently sized microfeatures. The first points on the curves are the heights of the as-printed features and the height at 0 seconds was measured by heating the samples to 270° C. at 20° C./min followed by rapid cooling. Overall, a good agreement between the model's prediction and the experimental data is achieved, indicating that the surface protrusions exhibit exponential decay driven by the surface tension. The model suggests that the kinetics of the decay in height of the protrusions are determined by the initial height of the protrusions, the surface tension, and the viscosity of the amorphous metal alloy. The smaller features exhibit large curvature, and hence are smoothened more rapidly.

In order to test the validity of this model Eq. (5) was used to calculate the viscosity. By incorporating the value of $h_o$ and a value for $\gamma=1$ N/m, the calculated viscosity values at 270° C. are in the range of $1-4\times10^7$ Pa·s. These values compare well to the viscosity calculated from the fragility parameter for the Pt-based amorphous metal alloy of $1.4\times10^7$ Pa·s at 270° C., substantiating the validity of Eq. (5).

The erasing time $t_e$ for a hemispherical feature of height $h_o$ can be estimated from Eq. (5) by setting $h/h_o=0.05$, which ensures that the remaining height after annealing for $t_e$ is 5% of the initial height. This results in the relationship $$t_e = \frac{9\eta h_o}{\gamma} \quad (6)$$

Figure 13:
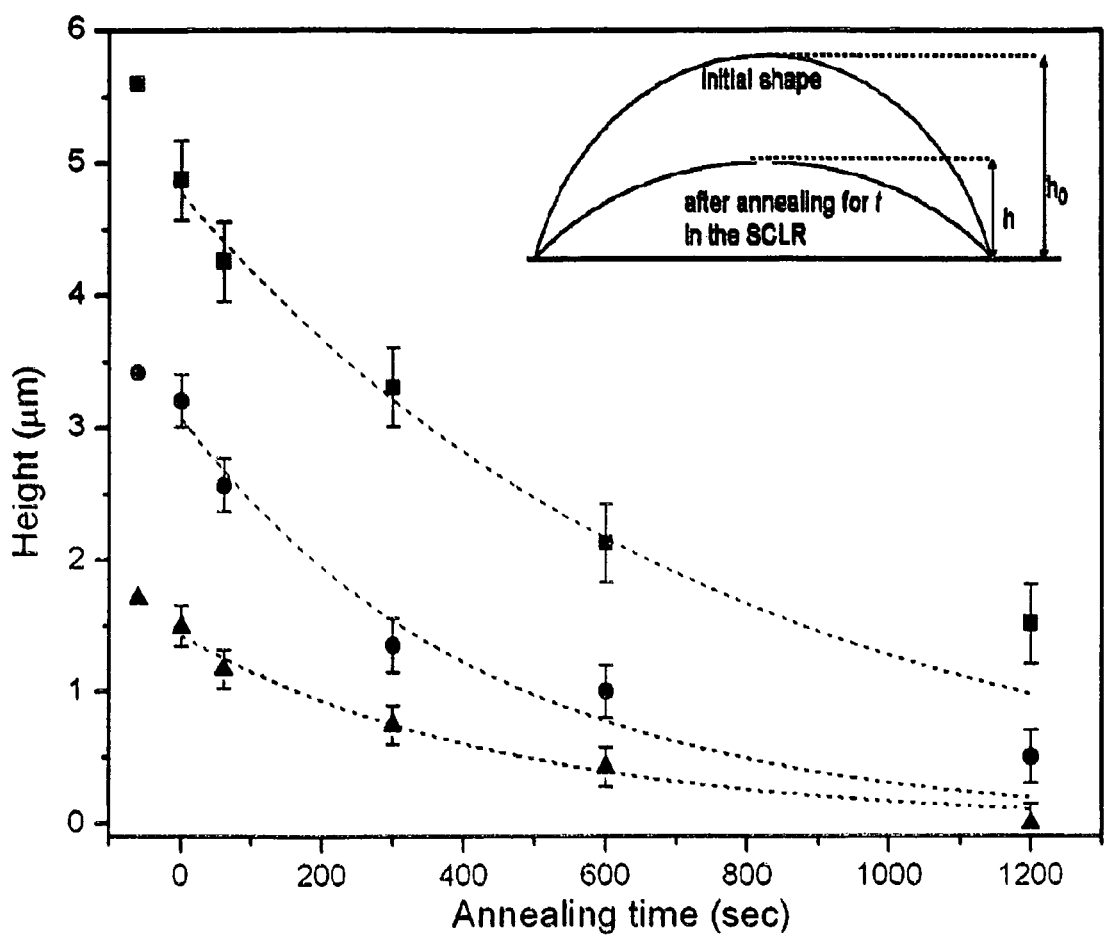
FIG. 13 depicts measured heights with increasing annealing time for three differently sized microfeatures. The dashed lines demonstrate the fitting curves obtained using Equation 5. The results are well fitted by the exponential decay expression. The inset depicts a schematic illustration of the change of height of a hypothetical feature upon annealing the supercooled liquid region. The initial height $h_o$ decreases to h after annealing for t.

The erasing time primarily depends on the height of the as-printed features and the viscosity. An increase in annealing temperature lowers the viscosity, and hence, the erasing time but the total time available before crystallization is also decreased. Selection of the annealing temperature is done based on the temperature dependence of viscosity and the crystallization time of the amorphous metal alloy. In addition, the time to reach crystallization in the SCLR has been shown to be growth controlled, with a cumulative degradation of the thermal stability after multiple annealing cycles. Therefore, the maximum number of write-erase cycles achievable for a fixed feature size depends on the total time consumed in writing and erasing. FIG. 13 shows an example where the features of 35 nm diameter were imprinted on the Pt-based BMG using an alumina mold. Features as small as of 13 nm diameter have been imprinted on amorphous metal alloys using TPF. According to Eq. (6) it takes 1.3 seconds at 270° C. to completely erase a hemispherical feature with a 13 nm diameter on $Pt_{57.5}Cu_{14.7}Ni_{5.3}P_{22.5}$. The total time to crystallization at 270° C. for $Pt_{57.5}Cu_{14.7}Ni_{5.3}P_{22.5}$ amorphous metal alloy is 1200 seconds. This suggests that a 13 nm diameter feature can be written and erased repeatedly for up to 900 times, assuming that the writing time is negligible. Negligible short writing times can be achieved, for example by the use of an atomic force microscope.

Figure 14:
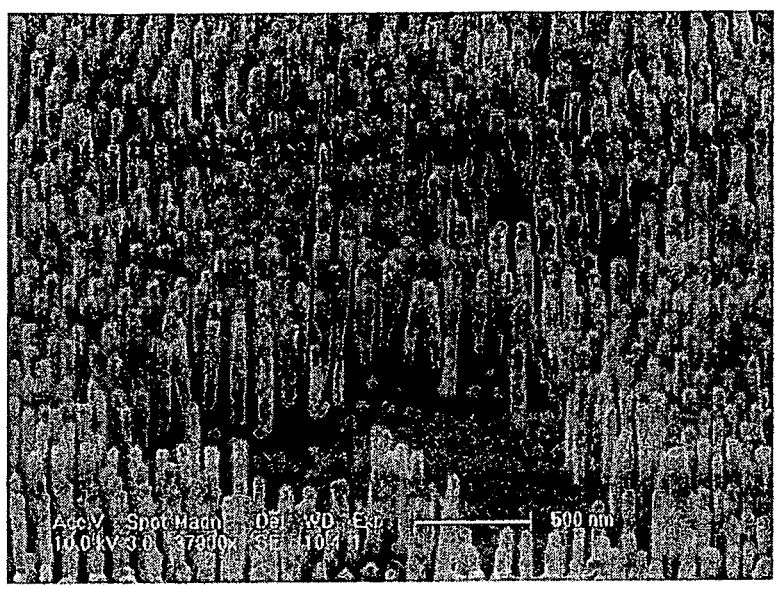
FIG. 14 shows the SEM image of 35 nm size features imprinted on $Pt_{57.5}Cu_{14.7}Ni_{5.3}P_{22.5}$ BMG using an alumina mold.
Figure 15:
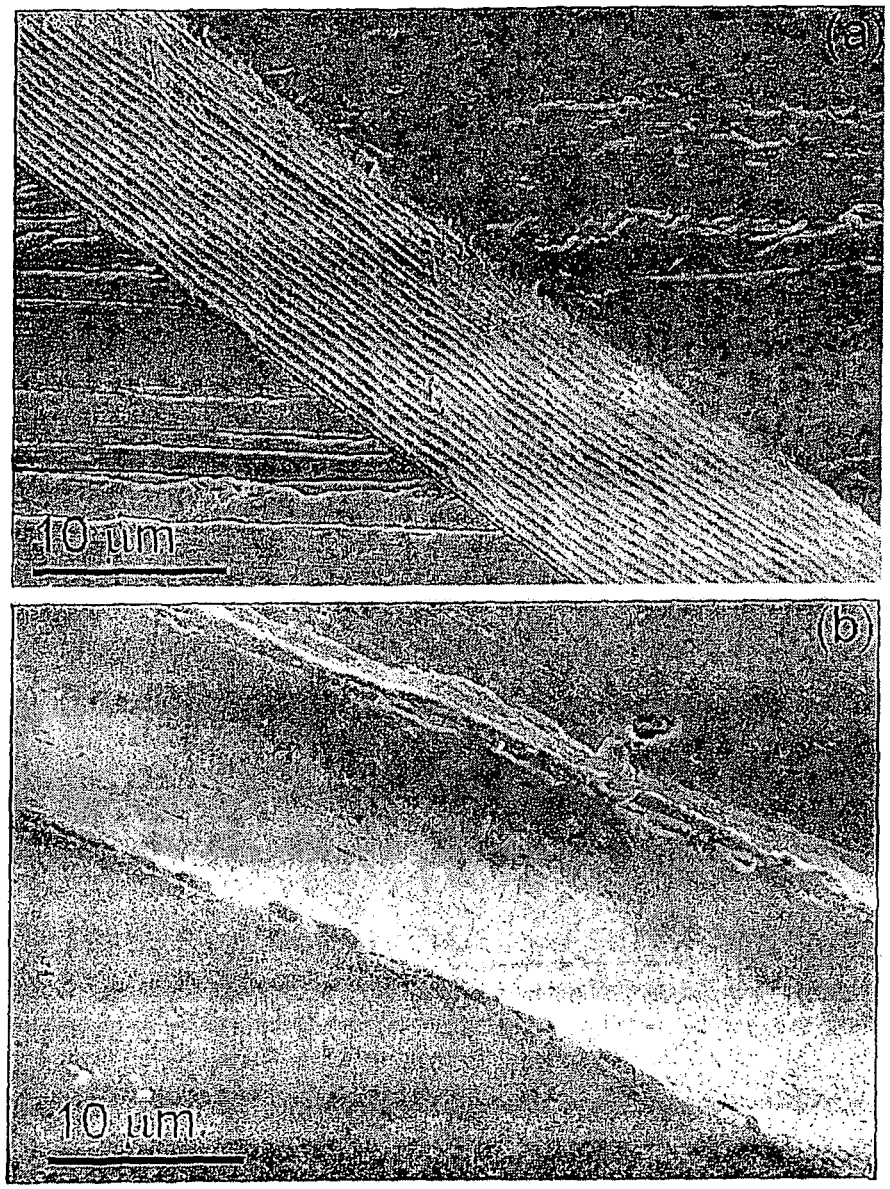
FIG. 15(a) depicts a SEM image of surface roughness on the $Pt_{57.5}Cu_{14.7}Ni_{5.3}P_{22.5}$ BMG transferred from a silicon die during thermoplastic forming
FIG. 15(b) depicts a SEM image showing the surface smoothened by annealing at 270° C. for 300 seconds.

Furthermore, the ability to alter the shape of an amorphous metal alloy in its SCLR can also be used as a surface smoothening process. As an example, micro components produced using Si dies often exhibit undesirable surface roughness originating from the deep-reactive-ion-etching (DRIE) used to generate the die. An example of such transferred roughness on an amorphous alloy surface is shown in FIG. 14(a). FIG. 14(b) shows the same surface after annealing at 270° C. for 300 seconds. By annealing, trenches which were originally about 300 nm in width have been eliminated without noticeably affecting the overall geometry of the features. The effectiveness of this smoothening process depends on the disparity between the length scale of the surface roughness and the typical length of the part's features. Appropriate annealing times for modifying the different length scale features can be estimated from the size dependent smoothening kinetics given by Eq. (5). Optimum annealing conditions for surface smoothening are chosen in such a way that surface roughness disappears on the time scale of the annealing but the important dimensions of the component remain noticeably unaltered. This can be used for example for a process that starts with an inexpensive master mold (having roughness), replicating the master mold with a BMG, and then smoothening the BMG to use it as a mold for another BMG.

The features imprinted on an amorphous metal alloy can be erased under the action of surface tension alone by annealing in the supercooled liquid region. This is possible because fragile amorphous metal alloys such as $Pt_{57.5}Cu_{14.7}Ni_{5.3}P_{22.5}$ exhibit very low viscosities in the SCLR. The kinetics of erasing depend on the size/shape of the microfeatures and the viscosity of the amorphous metal alloy, and it is possible to write and erase a 13 nm feature approximately 900 times on $Pt_{57.5}Cu_{14.7}Ni_{5.3}P_{22.5}$. This concept suggests the application of TPF of amorphous metal alloy as a rewritable high-density data storage media as well as a smoothening process for net-shaped components.

The present invention has utility in the areas of micro and nano-structures, high precision parts with high surface smoothness, high precision gears with high surface smoothness, nano to micro-size mold making with high surface smoothness, nano to micro-size features production, mirrors, net shape mirror production, and processing steps to reduce surface roughness for materials for which a temperature region exists where the ratio of surface tension to viscosity reaches a large value, given by way of example and not limitation.

Finally, while the invention has been particularly shown and described with respect to preferred embodiments thereof, it will be understood that changes in form and details may be made therein without departing from the scope and spirit of the invention.

What is claimed is:

1. A method of imprinting microfeatures or nanofeatures into an amorphous metal alloy layer, the method comprising the steps of:
   a) heating an amorphous metal alloy layer to a temperature within a supercooled liquid region of the amorphous metal alloy to soften the amorphous metal alloy layer;
   b) transferring a pattern into the softened amorphous metal alloy layer by:
      i) pressing a mold having a desired pattern disposed thereon into the softened amorphous alloy layer to transfer the pattern into the amorphous softened metal alloy layer, wherein the mold comprises a release layer and the release layer contacts the amorphous metal alloy layer being imprinted; and
      ii) removing the mold from the amorphous metal alloy layer once the amorphous metal alloy layer has cooled to a temperature below the supercooled liquid temperature region of the amorphous metal alloy; and
   c) cooling the amorphous metal alloy to a temperature below the supercooled liquid temperature region of the amorphous metal alloy to resolidify the amorphous metal alloy layer,
   wherein the amorphous metal alloy layer is disposed on a substrate, said substrate comprising a material selected from the group consisting of silicon, quartz, alumina and nickel-tungsten.

2. The method according to claim 1, wherein the amorphous metal alloy is selected from the group consisting of platinum-based, zirconium-based, iron-based, palladium-based, copper-based, nickel-based, cerium-based, gold-based and combinations of one or more of the foregoing.

3. The method according to claim 1, wherein the supercooled liquid temperature region comprises a temperature region between the glass transition temperature of the amorphous metal alloy and a crystallization temperature of the amorphous metal alloy.

4. The method according to claim 1, wherein the mold comprises a material selected from the group consisting of carbon, alumina, quartz, polymers, silicon, aluminum, brass, pyrolized carbon, amorphous metal alloys, and combinations of one or more of the foregoing.

5. The method according to claim 4, wherein the mold material is an amorphous metal alloy and the amorphous metal alloy used for the mold has a higher glass transition temperature than the amorphous metal alloy being imprinted.

6. The method according to claim 5, wherein the mold comprises a zirconium-based amorphous metal alloy and the amorphous metal alloy layer being imprinted comprises a gold or platinum-based amorphous metal alloy.

7. The method according to claim 5, wherein the difference in the glass transition temperature between the amorphous metal alloy of the mold and the amorphous metal alloy layer being imprinted is at least about 30° C.

8. The method according to claim 7, wherein the difference in the glass transition temperature between the amorphous metal alloy of the mold and the amorphous metal alloy layer being imprinted is at least about 50° C.

9. The method according to claim 1, wherein the release layer is selected from the group consisting of oxide, nitride, and silane-based release layers.

10. The method according to claim 1, wherein the step of cooling the amorphous metal alloy layer comprises cooling the amorphous metal alloy layer to approximately room temperature.

11. The method according to claim 10, wherein the amorphous metal alloy is slow cooled to room temperature.

12. The method according to claim 11, wherein the step of slow cooling comprises cooling at a rate of about 0.5° C./second.

13. The method according to claim 1, wherein the mold is reusable, whereby additional amorphous metal alloy layers may be imprinted.

14. A method of erasing a pattern formed in a surface of an amorphous metal alloy substrate, the method comprising the steps of:
   a) providing an amorphous metal alloy substrate having a pattern formed therein;
   b) heating the amorphous metal alloy substrate to a temperature within the supercooled liquid temperature region of the amorphous metal alloy for a period of time to soften the amorphous metal alloy,
   whereby the pattern formed in the amorphous metal alloy substrate is erased; and
   wherein after the pattern has been erased, a new pattern is imprinted into the amorphous metal alloy by;
   c) maintaining the amorphous metal alloy at a temperature within the supercooled liquid temperature region of the amorphous metal alloy for a period of time;
   d) transferring the new pattern into the softened amorphous metal alloy layer; and
   e) cooling the amorphous metal alloy to a temperature below the supercooled liquid temperature region of the amorphous metal alloy to resolidify the amorphous metal alloy layer.

15. The method according to claim 14, wherein the substrate is a mold having rough portions thereon and heating the substrate to the temperature within the supercooled liquid region of the amorphous metal alloy provides the required kinetics to smooth the mold.

16. The method according to claim 15, wherein the mold having rough portions thereon is used to replicate a bulk metallic glass mold,
   wherein the replicated bulk metallic glass mold is smoothed and used to mold a bulk metallic glass substrate, said bulk metallic glass substrate comprises a different bulk metallic glass than the bulk metallic glass mold, and
   wherein the bulk metallic glass substrate is also capable of being smoothed.

17. The method according to claim 16, wherein the bulk metallic glass substrate is micron-sized.

18. The method according to 14, wherein the erasing time is between about 0.1 and about 20 seconds.

19. The method according to claim 14, wherein the features to be erased have an aspect ratio of less than about 1.

20. The method according to claim 14, wherein the erasing and patterning steps are performed multiple times.

21. The method according to claim 13, wherein the surface tension of the heated amorphous metal alloy substrate is approximately 1 N/m.

22. A method of imprinting microfeatures or nanofeatures into an amorphous metal alloy layer, the method comprising the steps of:

a) heating an amorphous metal alloy layer to a temperature within a supercooled liquid region of the amorphous metal alloy to soften the amorphous metal alloy layer;
b) transferring a pattern into the softened amorphous metal alloy layer by:
  i) pressing a mold having a desired pattern disposed thereon into the softened amorphous alloy layer to transfer the pattern into the amorphous softened metal alloy layer, wherein the mold comprises a release layer and the release layer contacts the amorphous metal alloy layer being imprinted; and
  ii) removing the mold from the amorphous metal alloy layer once the amorphous metal alloy layer has cooled to a temperature below the supercooled liquid temperature region of the amorphous metal alloy; and
c) cooling the amorphous metal alloy to a temperature below the supercooled liquid temperature region of the amorphous metal alloy to resolidify the amorphous metal alloy layer.

23. The method according to claim 22, wherein the mold is reusable, whereby additional amorphous metal alloy layers may be imprinted.

* * * * *